United States Patent
Lehocki

(10) Patent No.: US 9,434,485 B1
(45) Date of Patent: Sep. 6, 2016

(54) MULTI-PURPOSE CARGO DELIVERY AND SPACE DEBRIS REMOVAL SYSTEM

(71) Applicant: Stephen C. Lehocki, Virginia Beach, VA (US)

(72) Inventor: Stephen C. Lehocki, Virginia Beach, VA (US)

(*) Notice: Subject to any disclaimer, the term of this patent is extended or adjusted under 35 U.S.C. 154(b) by 920 days.

(21) Appl. No.: 13/750,243

(22) Filed: Jan. 25, 2013

(51) Int. Cl.
*B64G 1/64* (2006.01)
*B64G 1/22* (2006.01)
*B64G 1/10* (2006.01)

(52) U.S. Cl.
CPC .............. *B64G 1/22* (2013.01); *B64G 1/1078* (2013.01); *B64G 1/64* (2013.01); *B64G 1/641* (2013.01)

(58) Field of Classification Search
CPC ...... B64G 1/1078; B64G 1/222; B64G 1/64; B64G 1/641; B64G 2001/1092; B64G 2004/005
USPC ......... 244/171.7, 172.4, 172.5, 173.1, 173.3, 244/171.3
See application file for complete search history.

(56) References Cited

U.S. PATENT DOCUMENTS

| | | | | |
|---|---|---|---|---|
| 4,431,333 A | * | 2/1984 | Chandler | B64G 1/641 244/172.4 |
| 4,834,325 A | | 5/1989 | Faget | |
| 4,867,395 A | * | 9/1989 | Taylor | B64G 1/14 244/158.1 |
| 4,880,187 A | * | 11/1989 | Rourke | B64G 1/1078 244/159.4 |
| 4,929,135 A | * | 5/1990 | Delarue | B64G 1/645 102/378 |
| 4,991,799 A | | 2/1991 | Petro | |
| 5,040,748 A | | 8/1991 | Torre | |
| 5,082,211 A | | 1/1992 | Werka | |
| 5,120,008 A | | 6/1992 | Ramohalli | |
| 5,125,601 A | * | 6/1992 | Monford, Jr. | B64G 1/641 244/173.1 |
| 5,242,134 A | | 9/1993 | Petro | |

(Continued)

FOREIGN PATENT DOCUMENTS

| | | |
|---|---|---|
| JP | 2004-98959 | 4/2004 |
| JP | 2010-69973 | 4/2010 |

(Continued)

OTHER PUBLICATIONS http://www.virgingalactic.com/launcherone.

*Primary Examiner* — Tien Dinh
*Assistant Examiner* — Michael A Fabula
(74) *Attorney, Agent, or Firm* — Shaddock Law Group, PC

(57) ABSTRACT

A debris removal system that includes at least a control module that includes a debris contact module storage area, a maneuverable arm and camera storage area, a maneuverable arm, a camera, and a universal coupler socket; a guidance, control, and communications unit; a maneuvering module, wherein the maneuvering module includes fuel/propellant storage containers that provide fuel/propellant, via a control and fuel/propellant delivery conduit, to one or more control thrusters; a propulsion module, wherein the propulsion module includes fuel/propellant storage containers that provide fuel/propellant to at least one primary thrust device; and a debris contact module, wherein the debris contact module includes a debris contact member attached or coupled to a debris contact element, and wherein a universal coupler pin extends from the debris contact member so as to allow the debris contact module to be attached or coupled to the universal coupler socket of the control module.

20 Claims, 8 Drawing Sheets

(56) References Cited

U.S. PATENT DOCUMENTS

| | | | | |
|---|---|---|---|---|
| 5,350,137 A * | 9/1994 | Henley | ............... | B64G 1/1085 244/158.1 |
| 5,405,108 A | 4/1995 | Martin, Jr. | | |
| 5,421,540 A | 6/1995 | Ting | | |
| 5,529,264 A * | 6/1996 | Bedegrew | ............... | B64F 1/04 102/274 |
| 5,816,539 A * | 10/1998 | Chan | ............... | B64F 1/04 244/135 R |
| 5,850,989 A * | 12/1998 | Trudeau | ............... | B64F 1/04 244/115 |
| 5,931,418 A * | 8/1999 | Eller | ............... | B64G 1/10 244/171.8 |
| 5,961,076 A * | 10/1999 | Eller | ............... | B64G 1/10 244/171.6 |
| 5,979,833 A * | 11/1999 | Eller | ............... | B64G 1/10 244/159.4 |
| 6,126,115 A * | 10/2000 | Carrier | ............... | B64G 1/641 244/137.4 |
| 6,193,193 B1 * | 2/2001 | Soranno | ............... | B64G 1/007 244/159.4 |
| 6,206,327 B1 | 3/2001 | Benedetti | | |
| 6,227,493 B1 * | 5/2001 | Holemans | ............... | B64G 1/641 244/173.1 |
| 6,231,010 B1 | 5/2001 | Schneider | | |
| 6,264,144 B1 | 7/2001 | Thornton | | |
| 6,439,508 B1 | 8/2002 | Taylor | | |
| 6,523,784 B2 | 2/2003 | Steinsiek | | |
| 6,655,637 B1 | 12/2003 | Robinson | | |
| 6,830,222 B1 | 12/2004 | Nock | | |
| 6,840,481 B1 | 1/2005 | Gurevich | | |
| 6,948,682 B1 | 9/2005 | Stephenson | | |
| 7,207,525 B2 | 4/2007 | Bischof | | |
| 7,219,859 B2 | 5/2007 | Johnson | | |
| 7,387,279 B2 | 6/2008 | Anderman | | |
| 7,587,325 B1 | 9/2009 | Scott | | |
| 7,669,804 B2 | 3/2010 | Strack | | |
| 7,780,119 B2 | 8/2010 | Johnson | | |
| 7,823,837 B2 | 11/2010 | Behrens | | |
| 7,861,975 B2 | 1/2011 | Behrens | | |
| 7,931,237 B2 | 4/2011 | Penzo | | |
| 8,226,046 B2 * | 7/2012 | Poulos | ............... | B64G 1/646 244/158.1 |
| 2002/0063188 A1 | 5/2002 | Steinsiek | | |
| 2002/0164204 A1 * | 11/2002 | Kaszubowski | ............... | B64G 1/641 403/322.1 |
| 2005/0103939 A1 * | 5/2005 | Bischof | ............... | B64G 4/00 244/172.4 |
| 2006/0016928 A1 * | 1/2006 | Thomas | ............... | B64G 1/641 244/10 |
| 2006/0219846 A1 * | 10/2006 | Johnson | ............... | B64G 1/24 244/158.9 |
| 2007/0063107 A1 * | 3/2007 | Mueller | ............... | B64G 1/14 244/173.1 |
| 2007/0228219 A1 * | 10/2007 | Behrens | ............... | B64G 1/1078 244/172.5 |
| 2007/0285304 A1 | 12/2007 | Cooper | | |
| 2008/0135687 A1 * | 6/2008 | Penzo | ............... | B64G 1/641 244/173.1 |
| 2008/0265098 A1 * | 10/2008 | Connelly | ............... | B64G 1/007 244/158.1 |
| 2009/0127398 A1 * | 5/2009 | Johnson | ............... | B64G 1/402 244/158.1 |
| 2011/0031352 A1 | 2/2011 | Behrens | | |
| 2011/0113605 A1 * | 5/2011 | Plaza Baonza | ............... | B64G 1/222 24/603 |
| 2011/0139936 A1 * | 6/2011 | Allen | ............... | B64G 1/1078 244/158.2 |
| 2012/0080563 A1 * | 4/2012 | Gryniewski | ............... | B25J 11/00 244/172.5 |
| 2013/0175401 A1 * | 7/2013 | Starke | ............... | B64G 1/1078 244/171.1 |
| 2014/0107865 A1 * | 4/2014 | Griffith, Sr. | ............... | B64G 1/10 701/2 |
| 2015/0115107 A1 * | 4/2015 | Andoh | ............... | B64G 1/242 244/171.1 |
| 2015/0247714 A1 * | 9/2015 | Teetzel | ............... | F42B 15/01 244/3.11 |

FOREIGN PATENT DOCUMENTS

| | | |
|---|---|---|
| RU | 2040448 C1 | 7/1995 |
| WO | WO03082674 | 9/2003 |

* cited by examiner

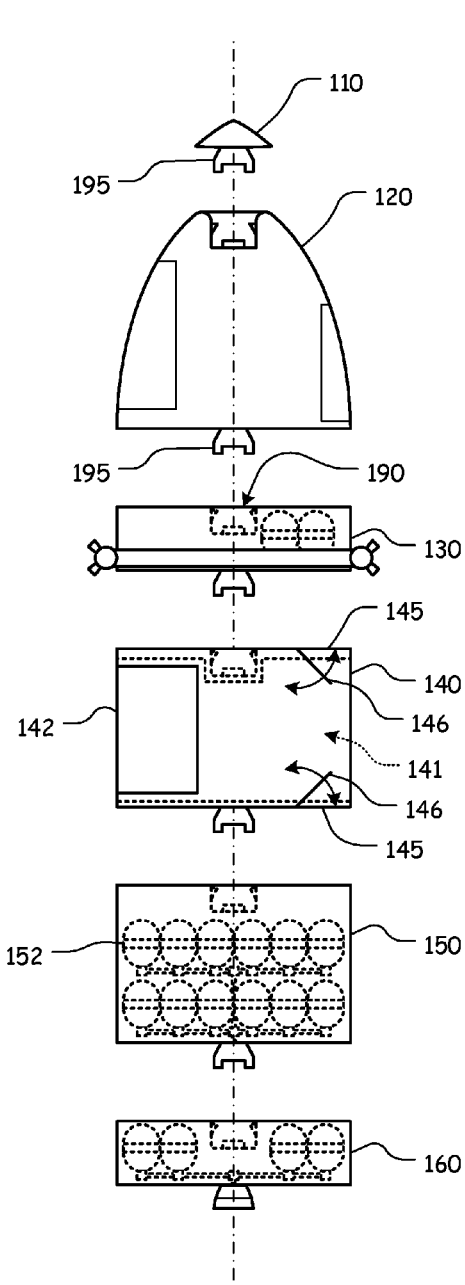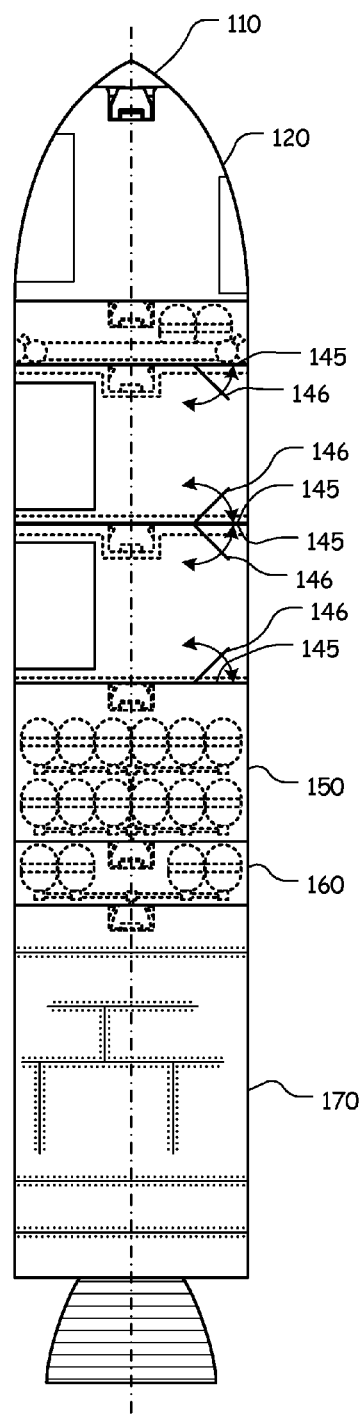
FIG. 1
FIG. 2

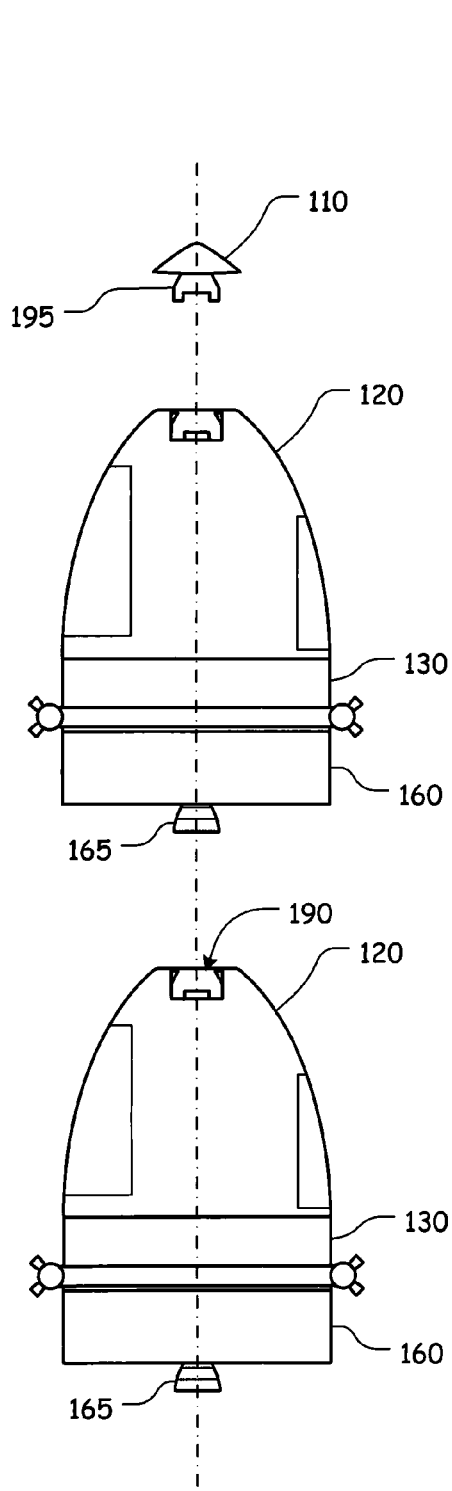
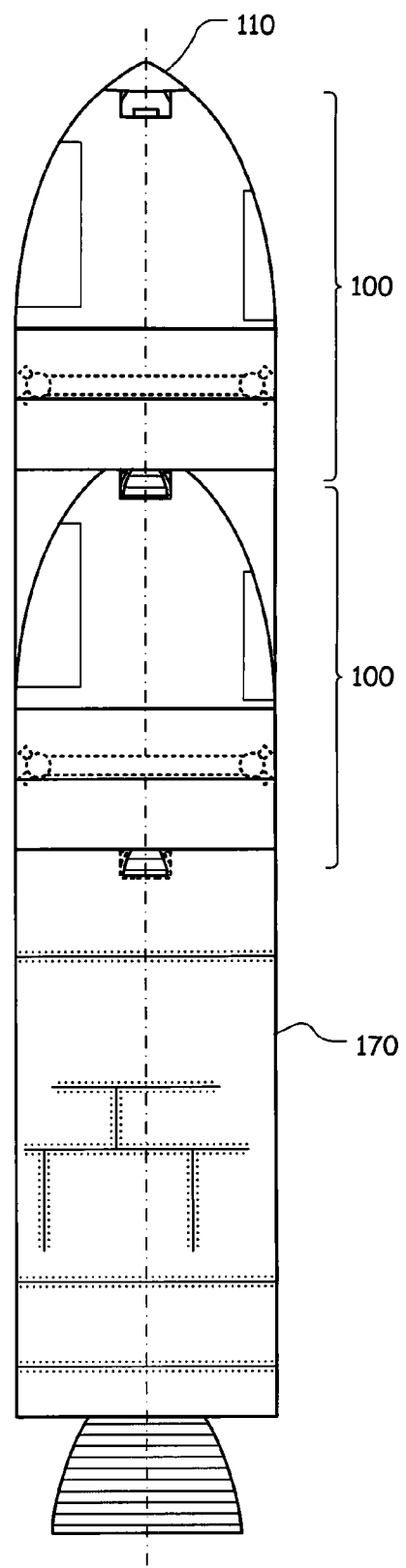
FIG. 9
FIG. 10

MULTI-PURPOSE CARGO DELIVERY AND SPACE DEBRIS REMOVAL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of atmospheric and outer space debris removal systems. More specifically, the present invention relates to configurable space debris removal systems.

2. Description of Related Art

According to Newton's laws, every object in a state of uniform motion tends to remain in that state of motion unless an external force is applied to it.

The relationship between an object's mass m, its acceleration a, and the applied force F is F=ma. Acceleration and force are vectors. The direction of the force vector is the same as the direction of the acceleration vector.

This is the most powerful of Newton's three Laws, because it allows quantitative calculations of dynamics: how do velocities change when forces are applied. Note the fundamental difference between Newton's Second Law and the dynamics of Aristotle: according to Newton, a force causes only a change in velocity (an acceleration); it does not maintain the velocity as Aristotle held.

This can be summarized by stating that under Newton, F=ma, but under Aristotle F=mv, where v is the velocity. Thus, according to Aristotle there is only a velocity if there is a force, but according to Newton an object with a certain velocity maintains that velocity unless a force acts on it to cause an acceleration (that is, a change in the velocity), if the frictional forces could be reduced to exactly zero (as in space) an object pushed at constant speed across a frictionless surface of infinite extent will continue at that speed forever after the pushing force is removed, unless a new force acts on it at a later time. Once account is taken of all forces acting in a given situation it is the dynamics of Galileo and Newton, not of Aristotle, that are found to be in accord with the observations.

It is well known to use either solid or liquid rocket motors as engines to propel items into the sky, the upper atmosphere, or outer space. Typically, a rocket motor is used to propel a single item, such as, for example, a satellite, to a high enough altitude that the satellite can be launched or jettisoned from the rocket motor and placed into a desired terrestrial orbit around the Earth.

To leave planet Earth an escape velocity of 11.2 km/s (approx. 25,000 mph) is required. For a given gravitational potential energy at a given position, the escape velocity is the minimum speed an object without propulsion needs, to be able to "escape" from the gravity (i.e. so that gravity will never manage to pull it back). If an object attains escape velocity, but is not directed straight away from the planet, then it will follow a curved path. Although this path does not form a closed shape, it is still considered an orbit.

Assuming that gravity is the only significant force in the system, this object's speed at any point in the terrestrial orbit will be equal to the escape velocity at that point (due to the conservation of energy). Because the total energy must always be zero, it is implied that the object remains at escape velocity. An actual escape requires that the terrestrial orbit not intersect the planet or its atmosphere, since this would cause the object to crash.

We put more junk up there every year; space has become an international landfill if you will.

Commercial space clean up ventures may make privatization of space more profitable and economically feasible.

BRIEF SUMMARY OF THE INVENTION

Unfortunately, multiple items are typically launched one at a time, each using its own, separate rocket motor.

However, the present invention is drawn to an orbiting debris removal system, with a utility cargo component to make it multi-purpose and more cost efficient. It primary use is to remove space debris orbiting the Earth.

The orbiting debris removal system uses the orbiting debris forward velocity to its own demise and/or propel or nudge space debris in a downward trajectory from a substantially stationary orbit.

The orbiting debris removal system maintains contact with debris and nudges it out of terrestrial orbit and controls its downward trajectory until it safely lets gravity do the rest, debris burns up upon reentry to earth's atmosphere and its downward trajectory is controlled to the point anything not burned up falls into ocean, this is accomplished without the use of grabbing/grasping devices or containers as in my cited prior art patents. One does not need to launch a bus to do a compact cars job.

The present invention accomplishes this by altering the direction and or speed of contacted object, the claims herein are to give the prospective end user the widest range and scope possible for future development of this invention and its full array of launch and recovery support system components by combining new and adapting proven prior art technology.

In various exemplary, nonlimiting embodiments, once launched, NASA take over unit controls and places craft near objects of interest the contact device could be fixed or deploy in front to control debris. Contact device could also be remotely attached to front of craft from a sub assembly boom.

In various exemplary, nonlimiting embodiments, the united with debris GPS tracking and solar electric controlled positioning thrusters would then allow debris to be safely tracked to a descending terrestrial orbit and released to burn up or splash down at sea.

Proper planning and tracking could position spacecraft for deployment in line with multiple objects so it can engage multiple targets.

The debris removal system can be restricted to the size of a shuttle bay or unrestricted for a rocket deployment.

The debris removal system may also be taken aloft from one of many aircraft private launch platforms, and with a proper mounting adapter be encapsulated and mounted on or under a delivery vehicle, later being launched in orbit from the delivery vehicle.

For ease of maintenance and support, it should be compartmented in modular type construction units (not unlike or similar to the construction methods for the F-18 hornet engines).

One of the purposes of this invention is to use the forward velocity of orbiting debris to its own demise by propelling or nudging the orbiting space debris into a downward trajectory from stationary orbit. In various exemplary embodiments, the systems of the present invention initiate contact with the orbiting space debris and then maintain contact with the space debris and nudges it out of orbit. Once the space debris has been nudged out of its terrestrial orbit, the systems and methods of the present invention act to control the downward trajectory of the debris until the Earth's gravitational pull is able to draw the debris to a known or determined contact location on the surface of the earth or ocean. In certain exemplary embodiments, a significant portion of the debris burns up upon reentry into Earth's atmosphere. In these exemplary, nonlimiting embodiments, the downward trajectory of the remaining debris is still controlled such that any portions of the debris not burned up or otherwise destroyed fall to the earth or into the ocean.

Because of the reduced cost, size, and weight of the systems and methods of the present invention, the present invention provides an attractive argument for government contract for space trash removal for a private venture company.

In various exemplary, nonlimiting embodiments, the debris removal systems of the present invention include at least some of a control module, a maneuvering module, a propulsion module, and a debris contact module. The control module typically includes a debris contact module storage area, a maneuverable arm and camera storage area, a guidance, control, and communications unit, a maneuverable arm, and a camera.

The maneuvering module typically includes fuel/propellant storage containers that provide fuel/propellant, via a control thruster ring, to a control thruster assembly or one or more control thrusters.

The propulsion module generally includes fuel/propellant storage containers that provide fuel/propellant to at least a primary thrust device.

The debris contact module includes a debris contact member attached or coupled to a debris contact element. The debris contact element may take a variety of forms, based on the desired debris to be encountered. For example, the debris contact element may comprise an inflated, filled, or expanded element having a substantially convex or concave shape. Alternatively, the debris contact element may comprise a cage or basket-like element. In still other embodiments, the debris contact element may comprise a substantially solid or malleable element.

The primary modules include a universal coupler socket and a universal coupler pin. Through use of the universal coupler socket and the universal coupler pin the various modules can be attached or coupled to one another to provide mission specific capabilities to the debris removal system.

In various exemplary, nonlimiting embodiments, the debris removal system further includes a nose cone, one or more storage modules, and/or one or more fuel/propellant modules (each including one or more fuel/propellant storage containers). The debris removal system may also be attached or coupled to an initial propulsion device.

In use, the debris removal system is launched and placed in a determined debris removal system orbit. When debris is detected, the debris removal module is controlled so as to leave the debris removal system orbit and is vectored to the orbit of the debris.

Upon reaching the debris orbit, the debris removal module is further controlled such that the debris contact element makes contact with the debris. Once contact is made between the debris contact element and the debris, the debris removal system is controlled to urge the debris from the debris orbit to a deteriorating orbit.

Once the debris is in the determined deteriorating orbit, the debris removal system may optionally continue to make contact with the debris and continue to urge the debris throughout at least a portion of the deteriorating orbit. If desired, the debris removal system may continue to follow the debris through the deteriorating orbit to be destroyed along with the debris. Alternatively, once the debris is in the deteriorating orbit, the debris removal system may optionally break contact with the debris and allow the debris to fall naturally to earth.

If the debris removal system breaks contact with the debris, the debris removal system will be controlled to return to the debris removal system orbit until additional debris is detected.

Accordingly, the presently disclosed invention provides a reusable or expendable debris removal system.

The presently disclosed invention separately provides a debris removal system having modular adaptability.

The presently disclosed invention separately provides a debris removal system that can be left in a safe orbit for future use.

The presently disclosed invention separately provides a debris removal system that can be refueled or attached or coupled to an additional fuel/propellant storage module.

The presently disclosed invention separately provides a debris removal system that can be deployed or operated from an orbiting space station.

The presently disclosed invention separately provides a debris removal system that can be controlled remotely or preprogrammed.

The presently disclosed invention separately provides a debris removal system that can be delivered to space on or under a space vehicle or aircraft or launched from an airborne mother ship.

The presently disclosed invention separately provides a debris removal system having multi-use and multiple use capabilities.

The presently disclosed invention separately provides a debris removal system that can be configured to accommodate payloads of various sizes and shapes.

The presently disclosed invention separately provides a debris removal system that allows for multi-type space ventures.

The presently disclosed invention separately provides a debris removal system that is scalable.

The presently disclosed invention separately provides a debris removal system that can optionally be attached or coupled to storage modules for delivery of supplies or other cargo to an orbiting space platform before or after engaging space debris.

The presently disclosed invention separately provides a debris removal system that provides more economical ways to remove space debris or deliver cargo.

These and other features and advantages of the presently disclosed debris removal system are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 1 shows an exploded view of certain optional elements of a first exemplary embodiment of a debris removal system, according to this invention;

FIG. 2 shows certain optional elements of a first exemplary embodiment of a debris removal system, according to this invention;

FIG. 9 shows an exploded view of an exemplary embodiment of a debris removal system, wherein two discrete debris removal systems are aligned to be attached or coupled together, according to this invention;

FIG. 10 shows an exemplary embodiment of a debris removal system, wherein two discrete debris removal systems are attached or coupled together, according to this invention;

DETAILED DESCRIPTION OF THE INVENTION

Figure 3A:
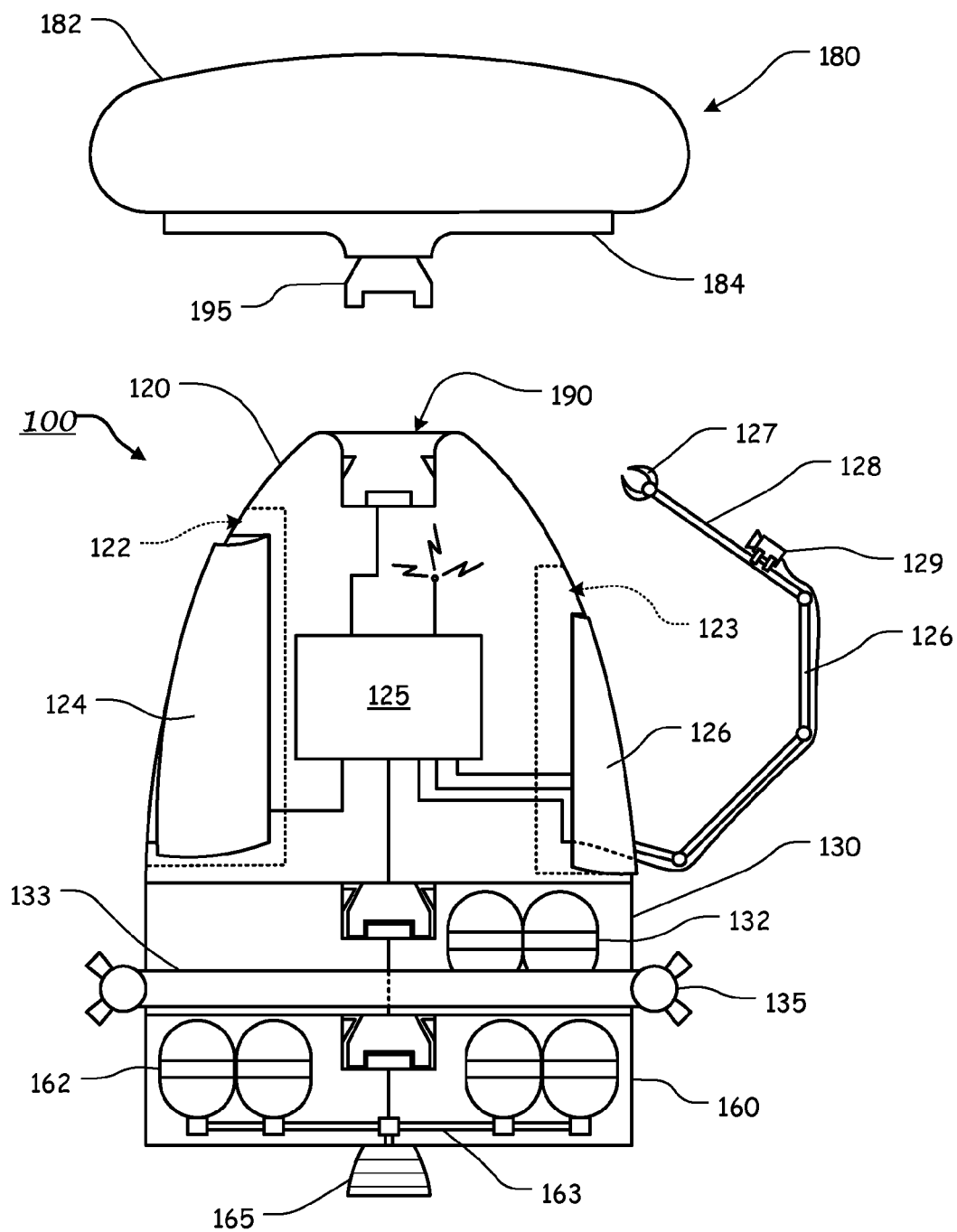
FIG. 3A shows a first exemplary embodiment of a debris removal system, according to the present invention.

For simplicity and clarification, the design factors and operating principles of the debris removal systems according to this invention are explained with reference to various exemplary embodiments of debris removal systems according to this invention. The basic explanation of the design factors and operating principles of the debris removal systems is applicable for the understanding, design, and operation of the debris removal systems of this invention. It should be appreciated that the debris removal systems can be adapted to many applications where debris is to be removed from the Earth's upper atmosphere or space.

It should also be appreciated that the terms "debris", "module", "debris removal", and "debris removal system" are used for basic explanation and understanding of the operation of the systems, methods, and apparatuses of this invention. Therefore, the terms "debris", "module", "debris removal", and "debris removal system" are not to be construed as limiting the systems, methods, and apparatuses of this invention. Furthermore, the terms "propulsion device" and "thrust device" are to be understood to be used interchangeably herein and to broadly include any devices capable of acting as a fuel/propellant device, including solid, liquid, compressed gas, compressed fluid, or other fuel/propellant devices.

For simplicity and clarification, the debris removal systems of this invention will be described as being used to remove a single debris item from the upper atmosphere or outer space. However, it should be appreciated that these are merely exemplary embodiments of the debris removal systems and are not to be construed as limiting this invention. Thus, the debris removal systems of this invention may be utilized to remove multiple pieces of debris from the upper atmosphere or outer space.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

In addition, it should be appreciated that when the term "attached" is used herein, the term is meant to imply that two or more items are connected directly to each other. When the term "coupled" is used herein, the term is meant to imply that two or more items are connected to each other by some intervening or interposed part or element. When the term "removably" or "releasably" is used herein, the terms are meant to imply that two or more items are connected to each other but can be separated (whether or not easily separated) without damaging either part. For example, items that are "removably" or "releasably" coupled are repeatably moveable between coupled and decoupled positions, while items that are "removably" or "releasably" attached are repeatably moveable between attached and unattached positions.

It should also be appreciated that certain details of, for example, the specific propulsion device or materials of construction used for the debris removal systems of the current invention, certain instructions regarding the assembly and use of the debris removal systems, methods for deploying the debris removal systems, and certain other items and/or techniques necessary for the implementation and/or operation of the various exemplary embodiments of the present invention are not provided herein because such elements are commercially available and/or such background information will be known to one of ordinary skill in the art to which the invention pertains. Therefore, it is believed that the level of description provided herein is sufficient to enable one of ordinary skill in the art to understand and practice the systems and/or methods described herein.

Figure 5:
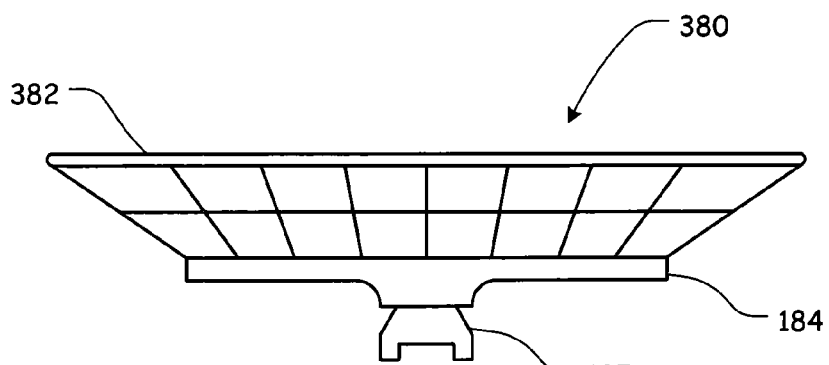
FIG. 5 shows an exemplary embodiment of another alternative debris contact module, according to this invention.
Figure 6:
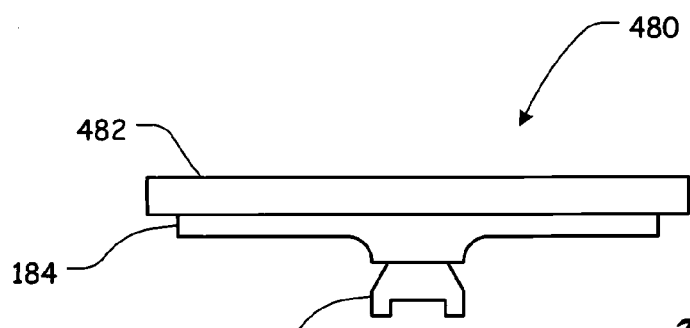
FIG. 6 shows an exemplary embodiment of yet another alternative debris contact module, according to this invention.
Figure 7:
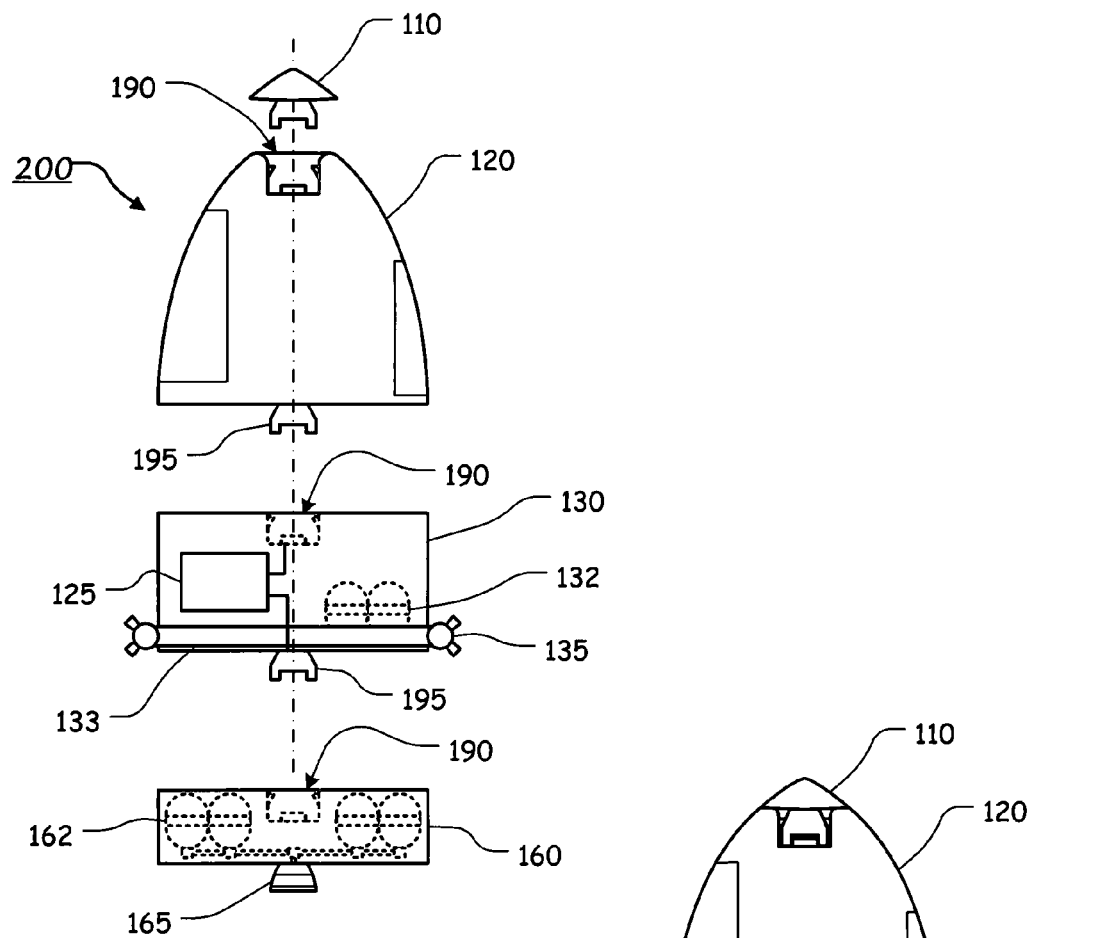
FIG. 7 shows an exploded view of certain optional elements of a second exemplary embodiment of a debris removal system, according to this invention.
Figure 8:
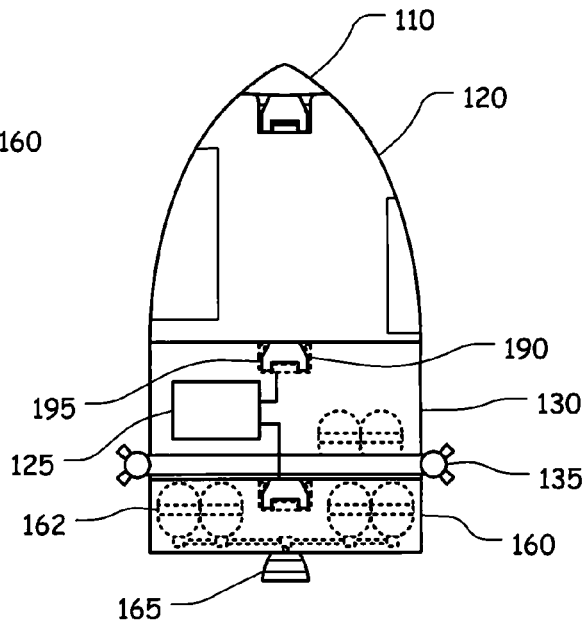
FIG. 8 shows certain optional elements of a second exemplary embodiment of a debris removal system, according to this invention.
Figure 11:
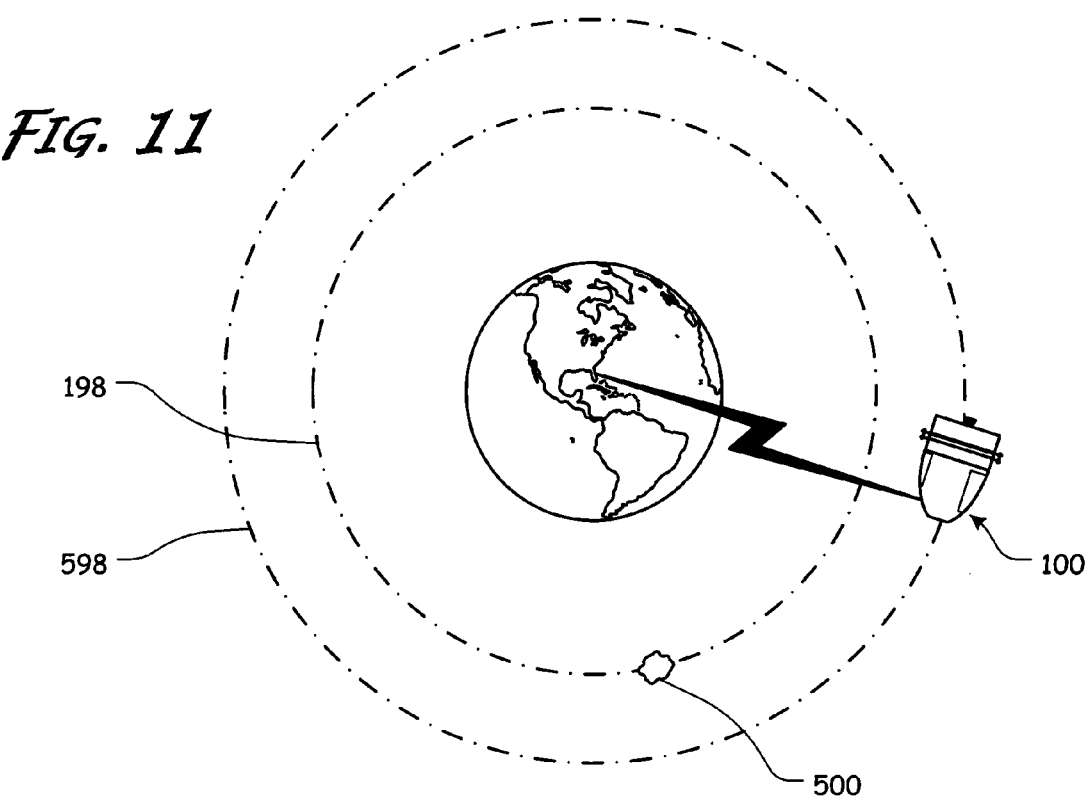
FIG. 11 shows relative terrestrial orbits of an exemplary debris removal module and space debris.
Figure 12:
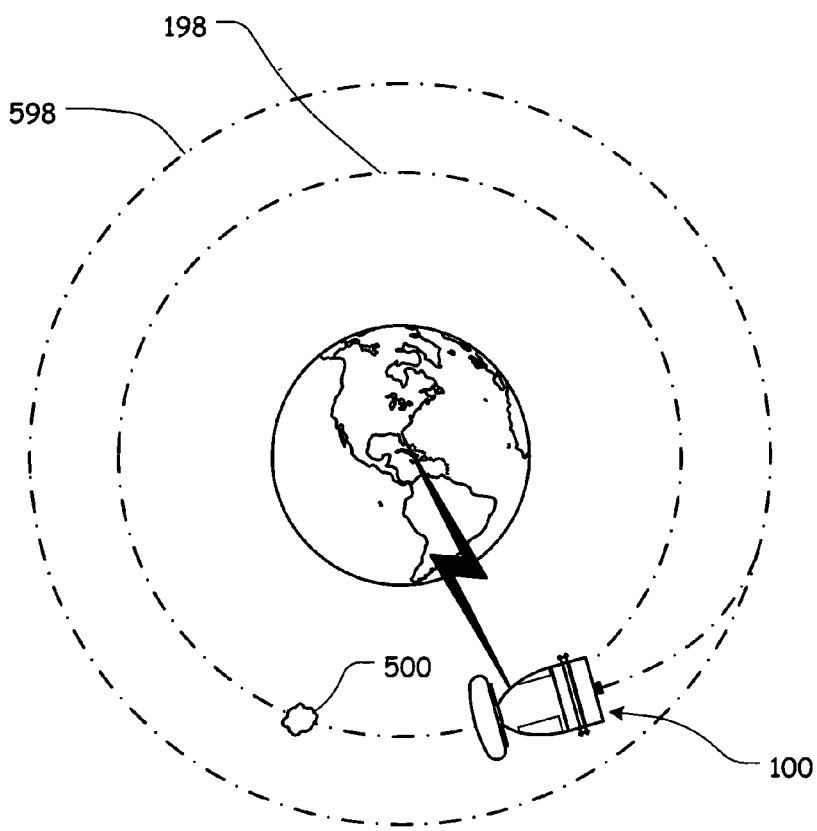
FIG. 12 shows an exemplary debris removal module altering its terrestrial orbit to intersect the terrestrial orbit of space debris, according to this invention.
Figure 13:
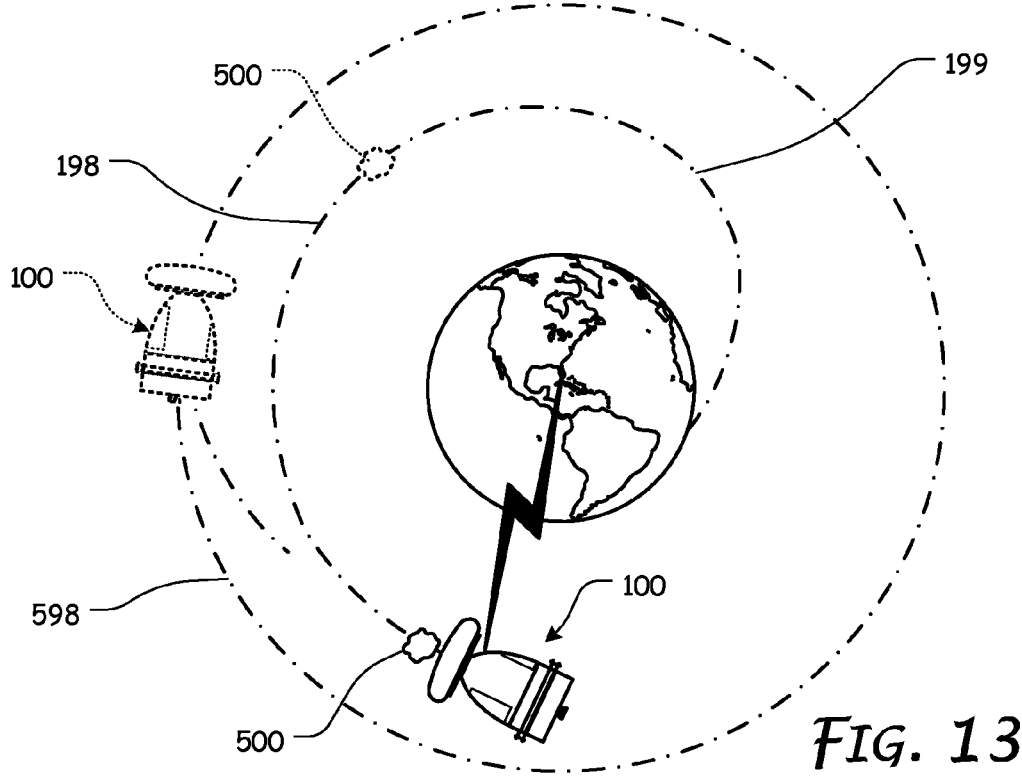
FIG. 13 shows an exemplary debris removal module altering its terrestrial orbit to urge space debris into a declining terrestrial orbit, according to this invention.
Figure 14:
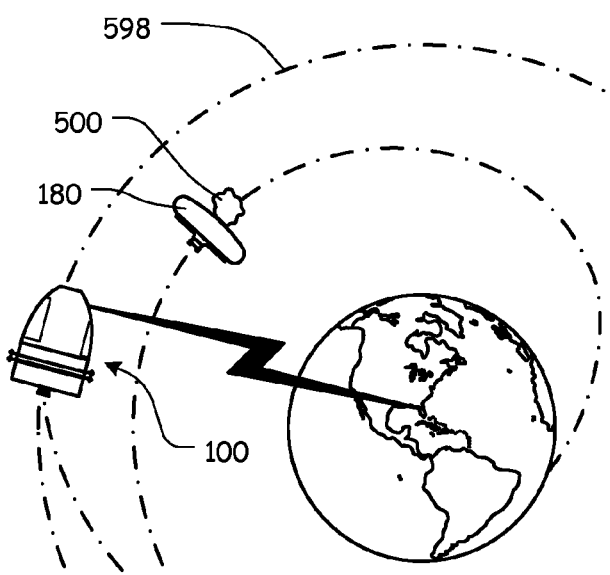
FIG. 14 shows an exemplary debris removal module returning to a determined terrestrial orbit, according to this invention.

Turning now to the drawing FIGS., FIGS. 1-6 show certain elements and/or aspects of a first exemplary embodiment of the debris removal system 100, while FIGS. 7-8 show certain elements and/or aspects of a second exemplary embodiment of the debris removal system 200, each according to this invention. In illustrative, non-limiting embodiment(s) of this invention, as illustrated in FIGS. 1-3B, the debris removal system 100 comprise at least some of a control module 120, a maneuvering module 130, a propulsion module 160, and a debris contact module 180.

In various exemplary, non-limiting embodiments, the control module 120 includes a debris contact module storage area 122, a maneuverable arm and camera storage area 123, a guidance, control, and communications unit 125, a maneuverable arm 128, and a camera 129.

The debris contact module storage area 122 comprises a cavity or space that is sized to accommodate one or more debris contact modules 180 and/or other tools or cargo, while the maneuverable arm and camera storage area 123 comprises a cavity or space that is sized to accommodate at least the maneuverable arm 128.

It should be appreciated that while specific items are shown and/or described as being stored in the debris contact module storage area 122 and the maneuverable arm and camera storage area 123, the debris contact module storage area 122 and the maneuverable arm and camera storage area 123 can be sized so as to accommodate a variety of desired items. It should also be appreciated that the debris contact module storage area 122 and the maneuverable arm and camera storage area 123 can be closed off or sealed from an external environment by appropriate doors or hatches 124 and 126, respectively.

In certain exemplary embodiments, the control module 120 optionally includes the guidance, control, and communications unit 125. If included, the guidance, control, and communications unit 125 can be pre-programmed and/or can receive initial, updated, or real-time data and/or information from a ground-based or space-based transmitter or transceiver. The data and/or information can include, for example, information or data regarding a desired terrestrial orbit or an orbit held by particular piece of debris. The guidance, control, and communications unit 125 can also include command and control information for operating the various elements of the debris removal vehicle 100.

The guidance, control, and communications unit 125 may comprise a computerized tracking device assembly unit that contains GPS and navigation systems computers and acts as on board data mission control center.

In certain embodiments, the guidance, control, and communications unit 125 may also include a radar for identifying and tracking space debris. In these embodiments, the debris removal vehicle 100 is able to be guided, via input from the radar into the guidance, control, and communications unit 125, to identify, track, and intercept space debris, without the necessity of additional command and control input.

The maneuverable arm 128 comprises a controllable arm 126 having at least one gripping or connecting element 127 that allows the maneuverable arm 128 to grasp and maneuver at least the debris contact module 180. As mentioned above, the maneuverable arm 128 is storable in a maneuverable arm and camera storage area 123.

Figure 3B:
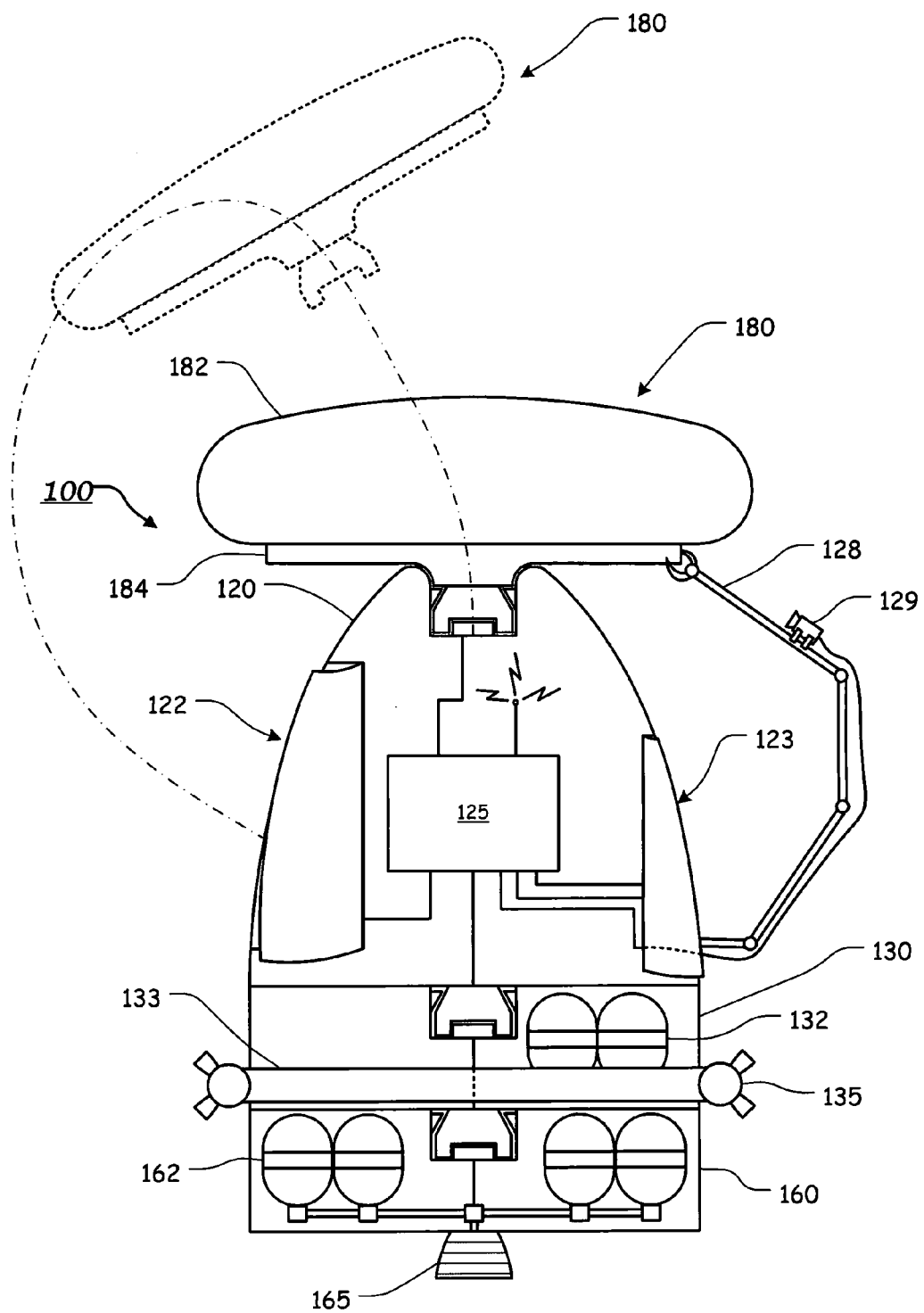
FIG. 3B shows an exemplary embodiment of a debris removal system securing an exemplary debris contact module, according to this invention.

As illustrated most clearly in FIG. 3B, the maneuverable arm 128 can be manipulated to remove an exemplary debris contact module 180 from a debris contact module storage area 122 and position the debris contact module 180 such that the universal coupler pin 195 is mated with the universal coupler socket 190.

In various exemplary embodiments, a camera 129 is mounted on the maneuverable arm 128 so that images can be relayed, via the guidance, control, and communications unit 125, to, for example, a control center. The camera 129 can provide the debris removal vehicle 100 with the ability to operate from start to finish, once debris removal vehicle 100 is deployed into an appropriate terrestrial orbit. Alternatively, the camera 129 can provide images to be used by a remote pilot or a mission commander/coordinator for proper selection and installation of a contact device.

The maneuvering module 130 typically includes fuel/propellant storage containers 132 that provide fuel/propellant, via a control and fuel/propellant delivery conduit 133, to one or more control thrusters 135. Each control thruster 135 is connected, via a fuel/propellant line (not shown), to at least one fuel/propellant storage container 132 housed within the maneuvering module 130. Activation and control of the control thrusters 135 is provided by the guidance, control, and communications unit 125, which is electrically and/or mechanically connected to the control and fuel/propellant delivery conduit 133 and/or the control thrusters 135.

The maneuvering module 130 provides thrust to control debris engagement, maintain contact with debris, and initiate any desired de-orbit downward trajectory. In various exemplary embodiments, the control thruster 135 can include downwardly directed axial thruster nozzles for velocity addition to the maneuvering module 130 and/or outward directed thrust nozzles for pitch, roll, and yaw control of the maneuvering module 130. The nozzles of the control thruster 135 may be set up in a manifold arrangement in two sets of four, each nozzle being individually controllable for 360° rotation. Optionally, the maneuvering module 130 may include one set of four control thrusters 135 facing forward and another set of four control thrusters 135 facing aft for maximum control. The nozzles of the control thruster 135 may be battery controlled and a solar battery charging system may be incorporated together with a solar panel power supply system.

Each control thruster 135 is coupled to at least one fuel/propellant storage container 132 via a valve means and the control and fuel/propellant delivery conduit 133. Each fuel/propellant storage container 132 is formed so as to contain an appropriate amount of fuel/propellant for the control thruster 135.

The capacity and specific contents of each fuel/propellant storage container 132 may vary. In various exemplary embodiments, each fuel/propellant storage container 132 contains sufficient fuel/propellant for the control thruster 135 to remain active for a sufficient time to allow the debris removal vehicle 100 to be maneuvered for a particular mission. The fuel/propellant storage container 132 may be pressurized or may include a pressurizing means (not shown), such as a fuel/propellant pump, which provides pressure or additional pressure to the fuel/propellant, such that the fuel/propellant may be delivered to a control thruster 135 under a predetermined or variable pressure or volume.

The valve means within the control and fuel/propellant delivery conduit 133 is used to regulate the flow of fuel/propellant from the fuel/propellant storage container 132 to a control thruster 135. It should be appreciated that the construction of the valve means is a design choice based on the desired fuel/propellant volume and flow rate and/or the functionality of the valve means.

It should be appreciated that the amount of fuel/propellant delivered to a given control thruster 135 as well as the mix of fuel/propellant or fuel/propellants delivered to the control thruster 135 may be varied in order to provide varied amounts of thrust from the control thruster 135. Additionally, further control and trim may be established, for example, by using opposing control thrusters 135 fed through a mixing valve or separate valves for each control thruster 135 or as a rotating nozzle.

In various exemplary embodiments, the control and fuel/propellant delivery conduit 133 may include a pressurizing means (not shown), such as a fuel/propellant pump, which provides pressure or additional pressure to the fuel/propellant, such that the fuel/propellant may be delivered to the control thruster 135 under a predetermined or variable pressure or volume.

Therefore, it should be appreciated that the actual material used to form the fuel/propellant storage container 132 and the size and characteristics of the fuel/propellant storage container 132 used in the maneuvering module 130 is a design choice based on the desired weight, capacity, and/or functionality of the fuel/propellant storage container 132.

It should be appreciated that the term "propulsion means" is to be given its broadest meaning and that the particular propulsion means used in the maneuvering module 130 is a design choice based on the desired weight, thrust, activation time, and/or functionality of the control thruster 135. Therefore, it should be understood that the control thruster 135 may comprise any type of controllable or actuable rocket or jet propulsion system or other known or later developed propulsion means, regardless of whether the propulsion means utilizes a solid fuel/propellant or a liquid-fuel/propellant.

It should also be understood that in certain exemplary embodiments, certain of the elements, such as, for example, the fuel/propellant storage container 132, the valve means, and/or the control and fuel/propellant delivery conduit 133 may not be necessary in the maneuvering module 130. For example, if the control thruster 135 comprises a solid-fuel/propellant rocket or a substantially self-contained solid-fuel/propellant or liquid-fuel/propellant propulsion means, such as, for example, a Jet-Assisted Take-Off (JATO) type rocket, certain of the elements, such as, for example, the fuel/propellant storage container 132, the valve means, and/or the control and fuel/propellant delivery conduit 133 may not be necessary in the maneuvering module 130. In these exemplary embodiments, the guidance, control, and communications unit 125 may activate a solid-fuel/propellant rocket or a substantially self-contained solid fuel/propellant or liquid-fuel/propellant propulsion means.

As illustrated most clearly in FIGS. 9 and 10, the control thrusters 135 may be retracted for launch (or when not in use) and deployed for use.

The propulsion module 160 generally includes fuel/propellant storage containers 162 that provide fuel/propellant to at least one primary thrust device 165. As illustrated, the at least one primary thrust device 165 is connected, via a fuel/propellant delivery conduit 163, to a fuel/propellant storage container 162, housed within the propulsion module 160. Activation and control of the at least one primary thrust device 165 is provided by the guidance, control, and communications unit 125, which is electrically and/or mechanically connected to the primary thrust device 165. In various exemplary embodiments, the at least one primary thrust device 165 can include downwardly directed axial thruster nozzles for velocity addition to the propulsion module 160 and/or outward directed thrust nozzles for pitch, roll, and yaw control of the propulsion module 160.

The debris contact module 180 includes a debris contact member 184 attached or coupled to a debris contact element 182. A universal coupler pin 195 extends from the debris contact member 184 so as to allow the debris contact module 180 to be attached or coupled to the universal coupler socket 190 of the control module 120.

Figure 4:
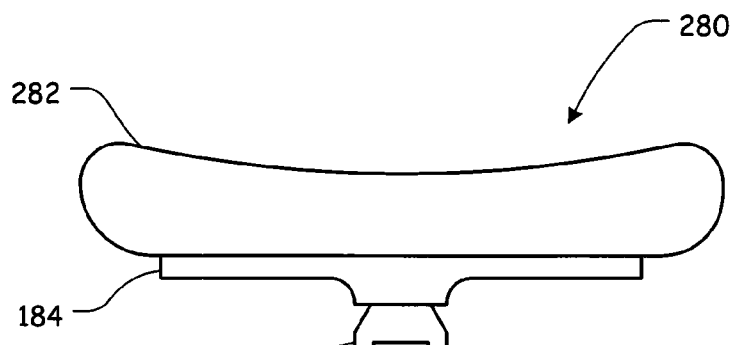
FIG. 4 shows an exemplary embodiment of an alternative debris contact module, according to this invention.

The debris contact element 182 may take a variety of forms, based on the desired debris to be encountered. For example, in various exemplary embodiments, the debris contact element 182 may comprise an inflatable element, an expansible bag or membrane, or a conforming pillow/cushion device. As illustrated in FIGS. 3A and 3B, the debris contact element 182 may comprise a filled or expanded element having a substantially convex outer shape. Alternatively, as illustrated in FIG. 4, the debris contact module 280 may include a debris contact element 282 that comprises a filled or expanded element having a substantially concave shape.

In various exemplary embodiments, as illustrated in FIG. 5, the debris contact module 380 may include a debris contact element 382 that comprises a cage or basket-like receptacle element. In still other embodiments, as illustrated in FIG. 6, the debris contact module 480 may include a debris contact element 482 that comprises a substantially solid or malleable element.

In certain exemplary embodiments, the debris contact element 182, 282, 382, or 482 is designed such that once contact is made with debris, the debris contact element 182, 282, 382, or 482 is able to maintain releasable contact with the debris without grabbing or grasping it. Alternatively, the debris contact element 182, 282, 382, or 482 may be constructed of a substantially sponge-like or absorbent material is designed to trap and hold small particles that contact a surface of the debris contact element 182, 282, 382, or 482.

Optionally, the debris contact module 182, 282, 382, or 482 may include an acoustic contact counter to tabulate the amount of debris contacted and removed. The acoustic contact counter would serve to at track at least the amount of debris removed.

One or more debris contact modules 182, 282, 382, or 482 may be stored in the debris contact module storage area 122, awaiting use. In certain exemplary embodiments, the debris contact modules 182, 282, 382, or 482 may be stored in a deflated or retracted state so as to take up less space in the debris contact module storage area 122. When needed, an appropriate debris contact module 180 may be retrieved from the debris contact module storage area 122, for example, by the maneuverable arm 128. Once retrieved, the debris contact module 180 is maneuvered by the maneuverable arm 128 and aligned with the control module 120 such that the universal coupler pin 195 of the debris contact module 180 is secured within the universal coupler socket 190.

In various exemplary embodiments, each of the primary modules (i.e., the control module 120, the maneuvering module 130, the storage module 140, the fuel/propellant module 150, and potentially the propulsion module 160) includes a universal coupler socket 190 and/or a universal coupler pin 195. The universal coupler socket 190 includes a recess that is appropriately sized and shaped to receive a universal coupler pin 195 so that the universal coupler pin 195 is releasably attached or coupled within the universal coupler socket 190. In various exemplary embodiments, the universal coupler socket 190 may have various retractable protrusions that are shaped so as to mate with corresponding recesses in the universal coupler pin 195.

In certain exemplary embodiments, interaction between the universal coupler pin 195 and the universal coupler socket 190 is controlled by the guidance, control, and communications unit 125 and not only provide physical coupling of the various modules to one another, but also provide electrical or fluid connection or communication between the coupled modules.

Through use of the universal coupler socket 190 and the universal coupler pin 195 the various modules can be attached or coupled to one another to provide mission specific capabilities to the debris removal system 100. For example, as illustrated in FIGS. 1 and 2, a variety of modules can be attached or coupled to one another in a mission specific orientation.

In various exemplary, nonlimiting embodiments, the debris removal system 100 further includes a nose cone 110, one or more storage modules 140, and/or one or more fuel/propellant modules 150 (each including one or more fuel/propellant storage containers 152). The debris removal system 100 may also be attached or coupled to an initial propulsion device 170.

The nose cone 110 typically also includes a universal coupler pin 195, such that the nose cone 110 can be attached or coupled to the control module 120, if desired.

As illustrated in FIGS. 1 and 2, one or more storage modules 140 may be attached or coupled to the control module 120. If included, each storage module 140 includes at least one internal cavity 141 for storing supplies, tools, or other elements. At least one access hatch 142 is included such that the internal storage cavity 141 can be accessed from outside the storage module 140. In certain exemplary embodiments, each storage module 140 includes at least one pass-through aperture 145 having a door 146. Typically, each storage module 140 includes at least two pass-through apertures 145 positioned such that pass-through apertures 145 of adjacent storage modules 140 are aligned to allow passage through the adjacent pass-through apertures 145, as illustrated in FIG. 2.

The one or more reusable/refillable fuel/propellant modules 150 each including one or more fuel/propellant storage containers 152. The fuel/propellant modules 150 can be included to extend the operational range of the present invention and can be sized to store sufficient fuel/propellant to support a single mission or multiple debris engagement missions. Through the incorporation of the universal coupler pin 195 and the universal coupler socket 190 of the various modules of the present invention, the fuel/propellant modules 150 can be quickly connected or removed from an assembly of modules.

The initial propulsion device 170 may comprise one or more solid, liquid, compressed gas, compressed fluid, or other equivalent propulsion devices or any known or later developed engine, motor, solid or liquid fuel/propellant rocket, missile, or the like, which is capable of providing sufficient force to propel the initial propulsion device 170, the debris removal vehicle 100, and any additional attached or coupled modules. The size, power, and configuration of the initial propulsion device 170 is a design choice based on the characteristics of the particular initial propulsion device 170, the debris removal vehicle 100, any additional attached or coupled modules, and the amount of thrust desired or needed for a particular application.

Therefore, it should be understood that the initial propulsion device 170 may comprise any type of controllable or actuable rocket or jet propulsion system or other known or later developed propulsion means, regardless of whether the propulsion means utilizes a solid fuel/propellant or a liquid fuel/propellant.

FIGS. 7-8 show an exploded view and any attached/coupled view, respectively, of a second exemplary embodiment of a debris removal system 200, according to this invention. As illustrated in FIGS. 7-8, the debris removal system 200 is similar to the debris removal system 100, but for the fact that the guidance, control, and communications unit 125 is located within the maneuvering module 130. When the exemplary modules are attached or coupled together, as illustrated in FIG. 8, the guidance, control, and communications unit 125 is electrically connected to both the control module 120 and the propulsion module 160.

As illustrated in FIGS. 9-10, multiple debris removal systems 100 can be attached or coupled together if desired. While FIGS. 9-10 illustrate two debris removal systems 100 being attached or coupled together, it should be appreciated that any desired number of debris removal systems 100 can be attached or coupled together depending upon the capabilities needed for a specific mission or task.

Furthermore, while FIGS. 9-10 illustrate two exemplary debris removal systems 100 being attached or coupled together via interaction of a universal coupler pin 195 and a universal coupler socket 190, two or more exemplary debris removal systems 100 may be attached, coupled, or positioned together using systems and/or methods of the Configurable Payload Delivery System, as described in co-pending U.S. patent application Ser. No. 13/741,430.

When in use, as illustrated in FIGS. 11-14, the debris removal system 100 (or 200) is launched and placed in a determined terrestrial orbit 598. When debris 500 is detected, the debris removal module 100 is controlled, via the guidance, control, and communications unit 125, to leave the determined terrestrial orbit 598 and is vectored to the debris orbit 198 of the debris 500.

Upon reaching the debris orbit 198, an appropriate debris contact module, such as, for example, debris contact element 182, is coupled to the control module 120. The debris removal module 100 is further controlled to approach and overtake the debris 500 such that the debris contact element 182 makes contact with the debris 500. Once contact is made between the debris contact element 182 and the debris 500, the debris removal system 100 is controlled to urge the debris 500 from the debris orbit 198 to a deteriorating terrestrial orbit 199.

Once the debris 500 is in the determined deteriorating terrestrial orbit 199, the debris removal system 100 may optionally continue to make contact with the debris 500 and continue to urge the debris 500 throughout at least a portion of the deteriorating terrestrial orbit 199. If desired, the debris removal system 100 may continue to follow the debris 500 through the deteriorating terrestrial orbit 199 to be destroyed along with the debris 500. Alternatively, once the debris 500 is in the deteriorating terrestrial orbit 199, the debris removal system 100 may optionally break contact with the debris 500 and allow the debris 500 to fall naturally to earth.

In those embodiments wherein the debris removal system 100 breaks contact with the debris 500, the debris removal system 100 may also break contact with the debris contact element 182. Thus, the debris contact element 182 may either remain with the debris 500 or the control module 120.

If the debris removal system 100 breaks contact with the debris 500, the debris removal system 100 will be controlled to return to the determined terrestrial orbit 598 until additional debris is detected. While in a determined terrestrial orbit 598, the debris removal vehicle 100 may optionally meet up with a space station or platform for refueling, to exchange propulsion, fuel, storage, or other modules, or for other mission related purposes.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

In addition, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A debris removal system, comprising:
   a control module, wherein said control module includes:
      a debris contact module storage area,
      a maneuverable arm and camera storage area,
      a maneuverable arm,
      a camera, and
      a coupler socket;
   a guidance, control, and communications unit;
   a maneuvering module, wherein said maneuvering module includes:
      fuel/propellant storage containers that provide fuel/propellant, via a control and fuel/propellant delivery conduit, to one or more control thrusters;
   at least one primary thrust device;
   a propulsion module coupled to said maneuvering module, wherein said propulsion module includes:
      fuel/propellant storage containers that provide fuel/propellant to said at least one primary thrust device; and
   a debris contact module, wherein said debris contact module includes:
      a debris contact member attached or coupled to a debris contact element, and
      wherein a coupler device coupler pin extends from said debris contact member so as to allow said debris contact module to be attached or coupled to said coupler socket of said control module;
   wherein said control module, said maneuvering module, and said propulsion module each include:
      a coupler socket and
      a coupler device coupler pin,
         wherein each coupler socket includes:
            a recess that is appropriately sized and shaped to receive a coupler device coupler pin so that a coupler device coupler pin may be releasably attached or coupled within a coupler socket,
         wherein said coupler devices and coupler sockets of each module are configured to couple with another of said coupler devices and/or coupler sockets of another module, and
         wherein said guidance, control, and communications unit is connected to at least one module.

2. The debris removal system of claim 1, wherein said coupler socket of one or more of said control module, said maneuvering module, and/or said propulsion module includes protrusions that are shaped to mate with corresponding recesses in said coupler device.

3. The debris removal system of claim 1, wherein said debris contact element comprises an inflatable element, an expansible bag or membrane, a conforming pillow/cushion device, or a basket-like element.

4. The debris removal system of claim 1, wherein said debris contact element comprises a substantially sponge-like or absorbent material.

5. The debris removal system of claim 1, wherein said debris contact module storage area includes a cavity that is sized so as to accommodate at least one debris contact module.

6. The debris removal system of claim 1, wherein said maneuverable arm and camera storage area includes a cavity that is sized so as to accommodate at least said maneuverable arm and said camera.

7. The debris removal system of claim 1, wherein said debris contact module storage area and said maneuverable arm and camera storage area are configured to be closed off or sealed from an external environment.

8. The debris removal system of claim 1, wherein said guidance, control, and communications unit is programmed with command and control information to operate elements of said debris removal system.

9. The debris removal system of claim 1, wherein said guidance, control, and communications unit comprises a means for receiving initial, real-time, or updated data and/or information that includes command and control information for operating elements of said debris removal vehicle.

10. The debris removal system of claim 1, wherein said guidance, control, and communications unit includes a radar for identifying and tracking space debris.

11. The debris removal system of claim 1, wherein said maneuverable arm comprises:
a controllable arm having
at least one gripping or connecting element.

12. The debris removal system of claim 1, wherein said camera is mounted on said maneuverable arm.

13. The debris removal system of claim 1, wherein said debris removal system is attached or coupled to an initial propulsion device, wherein said initial propulsion device comprises one or more solid, liquid, compressed gas, compressed fluid, or other equivalent propulsion device.

14. The debris removal system of claim 1, further comprising at least one storage module, wherein said at least one storage module includes
a coupler socket and
a coupler device,
wherein said coupler socket includes:
a recess that is appropriately sized and shaped to receive a coupler device so that a coupler device may be releasably attached or coupled within a coupler socket,
wherein said coupler devices and coupler sockets of each module are configured to couple with another of said coupler devices and/or coupler sockets of another module, such that said at least one storage module is releasably connected to at least one module, wherein each storage module includes:
at least one internal cavity,
at least one access hatch, and
at least two pass-through apertures.

15. The debris removal system of claim 1, wherein said guidance, control, and communications unit is located within said control module.

16. The debris removal system of claim 1, wherein said guidance, control, and communications unit is located within said maneuvering module.

17. A debris removal method, comprising:
controlling a debris removal system to maneuver to a determined terrestrial orbit, wherein said determined terrestrial orbit is an approximate terrestrial orbit of a portion of debris, wherein said debris removal system comprises:
a control module, wherein said control module includes:
a debris contact module storage area,
a maneuverable arm and camera storage area,
a maneuverable arm,
a camera, and
a coupler socket;
a guidance, control, and communications unit;
a maneuvering module, wherein said maneuvering module includes:
fuel/propellant storage containers that provide fuel/propellant, via a control and fuel/propellant delivery conduit, to one or more control thrusters;
at least one primary thrust device;
a propulsion module coupled to said maneuvering module, wherein said propulsion module includes:
fuel/propellant storage containers that provide fuel/propellant to said at least one primary thrust device; and
a debris contact module, wherein said debris contact module includes:
a debris contact member attached or coupled to a debris contact element, and
wherein a coupler device coupler pin extends from said debris contact member so as to allow said debris contact module to be attached or coupled to said coupler socket of said control module;
wherein said control module, said maneuvering module, and said propulsion module each include:
a coupler socket, and
a coupler device coupler pin,
wherein each coupler socket includes:
a recess that is appropriately sized and shaped to receive a coupler device coupler pin so that a coupler device coupler pin may be releasably attached or coupled within a coupler socket,
wherein said coupler devices and coupler sockets of each module are configured to couple with another of said coupler devices and/or coupler sockets of another module, and
wherein said guidance, control, and communications unit is connected to at least one module;
attaching or coupling, when said debris removal system is within a determined distance of said portion of debris, said debris contact module, via interaction of a coupler device coupler pin and a coupler socket, to said control module;
controlling said debris removal system to approach and overtake said debris such that at least a portion of said debris contact element makes contact with said debris; and
controlling said debris removal system to urge said debris to a deteriorating terrestrial orbit.

18. The debris removal method of claim 17, further comprising controlling said debris removal system such that at least a portion of said debris contact element continues to make contact with said debris throughout said deteriorating terrestrial orbit.

19. The debris removal method of claim 17, further comprising controlling said debris removal system such that said debris contact element breaks contact with said debris when said debris is in a deteriorating terrestrial orbit and returns to said determined terrestrial orbit.

20. The debris removal method of claim 17, further comprising controlling said debris removal system such that said control module is released or decoupled from said debris contact element when said debris is in a deteriorating terrestrial orbit and allowing said debris contact element to continue in said deteriorating terrestrial orbit with said debris.

* * * * *